INVENTOR.
ROBERT L. SELS

BY J. J. Landis

ATTORNEY

United States Patent Office 3,437,930
Patented Apr. 8, 1969

3,437,930
APPARATUS FOR APPLYING FORWARD CURRENT AND INVERSE PEAK VOLTAGES TO BRIDGE RECTIFIERS
Robert L. Sels, Reading, Pa., assignors to Western Electric Company, Incorporated, New York, N.Y., a corporation of New York
Filed Oct. 23, 1965, Ser. No. 503,284
Int. Cl. G01r 31/22, 31/26
U.S. Cl. 324—158    11 Claims

ABSTRACT OF THE DISCLOSURE

An appartus for aging a bridge rectifier, having a diode in each arm thereof, has a switching subcircuit associated with a different one of the bridge diodes. Each of the subcircuits has a silicon-controlled rectifier arranged so that during one half cycle of operation, the silicon-controlled rectifiers pass forward current through diodes associated therewith in a first pair of opposed arms of the bridge while inverse peak voltage is applied to the diodes in a second pair of opposed arms of the bridge. During the other half cycle of operation, forward current is passed through the second pair of opposed arms of the bridge while inverse voltage is applied across the first pair.

---

The present invention relates to apparatus for the determination of the capability of bridge rectifiers for performing properly under predetermined conditions of voltage and load current. More particularly, the invention relates to apparatus for testing bridge rectifiers under conditions which are equivalent to their operating conditions, but without the necessity of passing appreciable rectified current therethrough.

As is well known, a semiconductor bridge rectifier consisting of four diodes is commonly used for supplying to a load connected to one pair of diagonally opposed terminals (the output terminals) a full-wave rectified output current when alternating voltage is applied between its other two terminals (the input terminals). For any given application, the diodes in the bridge rectifier must have sufficient current-carrying capacity to supply the necessary load current, and must be capable of withstanding the peak inverse voltages which will be encountered.

While some testing of the bridge rectifier may be accomplished by a momentary inverse voltage test and a current test of each of its diode elements of brief duration, maximum assurance of suitability of the bridge rectifier for use without an early failure is best effected by a test of the bridge rectifier for a substantial operating period at full current and inverse voltage conditions, i.e., an operational test. In production, it would be quite impractical to test the bridge rectifiers individually by inserting each of them in a complete power supply and operating it for a predetermined length of time. Especially for rectifiers of substantial current and voltage ratings, it is impractical to make such tests simultaneously for groups of rectifiers, since the power requirements as well as the load heat dissipation would be prodigious.

An object of the present invention is to provide apparatus for adequately testing bridge rectifiers with maximum efficiency, enabling many bridge rectifier units to be tested simultaneously without the necessity for supplying thereto a great amount of electric power, and without the related problem of great load heat dissipation.

Another object is to provide a bridge rectifier test system for imposing on a rectifier its full operating voltage and current values with minimum requirements of applied power, and capable of imposing similar conditions on plural bridge rectifiers simultaneously.

With these and other objects in mind, apparatus, illustrating certain features of the invention, may include a unidirectional voltage source connected across a first pair of terminals of a bridge rectifier under test for applying substantial inverse voltages to the rectifier diodes. Means are provided for recurrently first passing current in the forward direction through one pair of bridge diodes and then passing current in the forward direction through the other pair of rectifier diodes.

More specifically, a first source of alternating voltage and a rectifier connected thereto are provided for producing a pulsating unidirectional output voltage to be applied between the output terminals of the bridge rectifier or rectifiers to be tested. This source and rectifier are not required to have appreciable current capacity, since the pulsating unidirectional voltage produced thereby is applied to the diodes of the bridge rectifier in the polarity opposite to their direction of conduction. Silicon controlled rectifier circuits are connected to the diodes in the bridge rectifier under test, and are so arranged and polarized as to pass full-rated currents in the forward direction through two opposite diodes of the bridge rectifier on alternate half-cycles of the alternating-current supply wave, and to pass equal currents through the other two diodes of the same bridge rectifier during the intervening half-cycles of the supply wave. During each half cycle the pulsating output voltage is applied in the reverse direction across each of the bridge diodes through which current is not then being passed. By the use of resistive current-dividing circuits, the controlled rectifier circuits are enabled to pass currents simultaneously through diodes of a plurality of bridge rectifiers under test.

The invention, as well as its objects, advantages and features will be more fully understood from the following detailed description, when considered in conjunction with the appended drawings, wherein.

Figure 1:
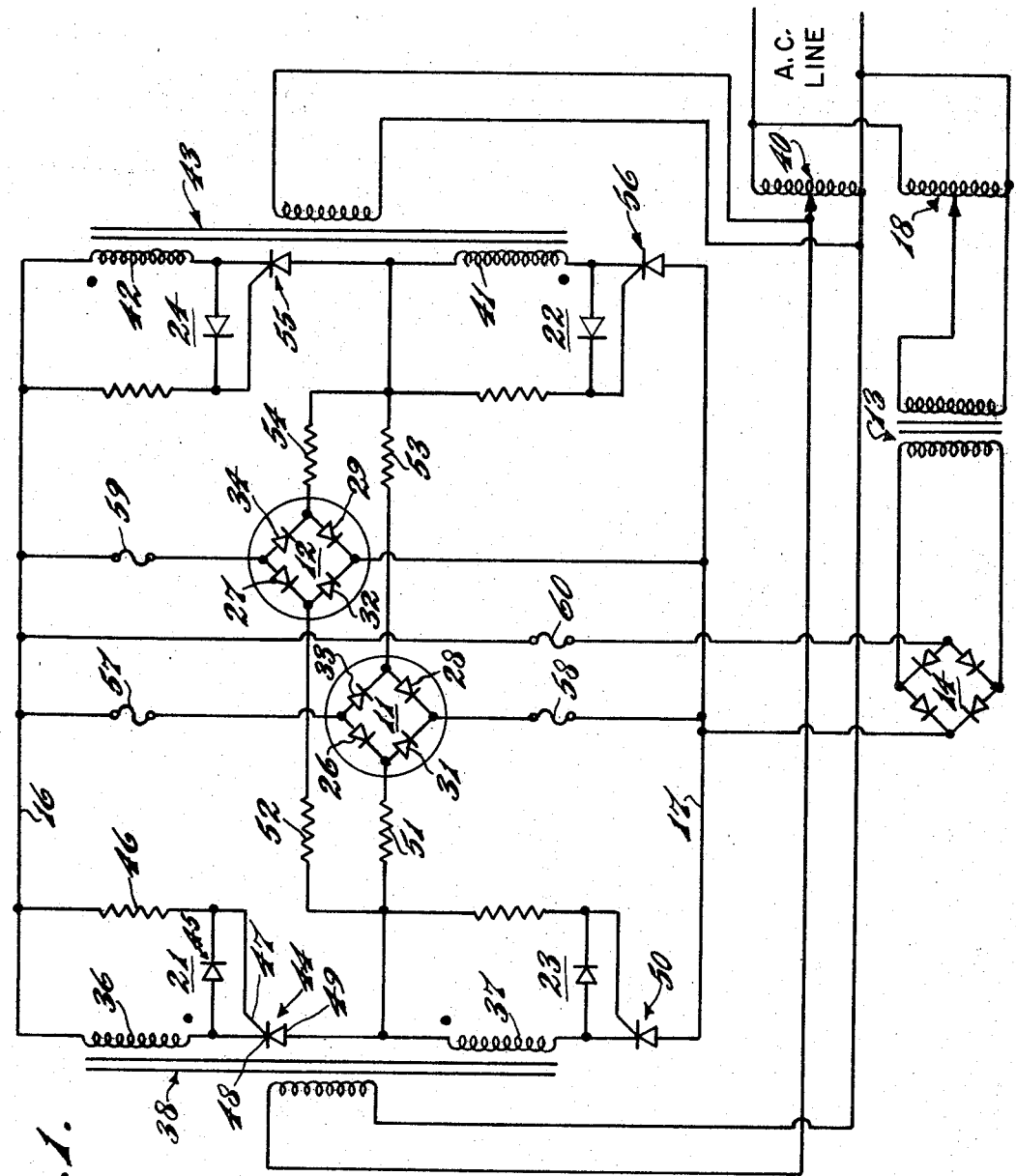
FIG. 1 is a schematic diagram of an embodiment of the invention for testing two bridge rectifiers.

A first embodiment of the invention is illustrated in FIG. 1 for testing two bridge rectifiers 11 and 12. The bridge rectifier 11 comprises a set of four silicon diodes 26, 28, 31 and 33, and the bridge rectifier 12 comprises a set of four silicon diodes 27, 29, 32 and 34. A source of pulsating, unidirectional voltage is connected to the rectifiers 11 and 12. This source comprises a transformer 13 and a bridge rectifier 14, the output terminals of the bridge rectifier 14 being connected to a pair of conductors 16 and 17 between which the output terminals of bridge rectifiers 11 and 12 are connected. Preferably, a variable autotransformer 18 is connected to the primary of the transformer 13 to permit adjustment of the potential applied between the conductors 16 and 17.

The bridge rectifier 14 is so polarized as to make the conductor 17 positive relative to the conductor 16, and thus to apply potentials to the diode elements of the bridge rectifiers 11 and 12 opposite to their directions of current conduction. The transformer 13 and the rectifier 14 are arranged to supply a high potential at very low current, for determining whether bridge rectifiers 11 and 12 will be caused to fail when subjected to their rated inverse voltage.

Four mutually identical circuits 21, 22, 23 and 24 are provided for causing current to flow in the forward current conduction sense through the diodes. The forward current supply circuit 21 is arranged to cause equal currents to flow through the diode 26 of the bridge rectifier 11 and the diode 27 of the bridge rectifier 12, these currents being of wave shape and timing corresponding to the alternate half-cycles (half-cycles of one polarity) of a sine wave. The circuit 22 is arranged to cause currents to flow in the forward conduction directions through diodes 28 and 29 of bridge rectifiers 11 and 12, respectively, in coincidence with the currents through the diodes 26 and 27.

The forward current supply circuit 23 is arranged to provide currents through diodes 31 and 32, and the forward-current supply circuit 24 is arranged to provide currents through diodes 33 and 34 in coincidence with the currents through diodes 31 and 32.

The forward current supply circuits 21 and 23 are illustrated as using two secondary windings 36 and 37 of a common transformer 38, and the forward current supply circuits 22 and 24 are illustrated as using two secondary windings 41 and 42 of another transformer 43. The primary windings of the transformers 38 and 43 are supplied through an adjustable autotransformer 40. As will be apparent, these four secondary windings could be on a single transformer, or on four separate transformers, if desired.

The forward current supply circuit 21 comprises a silicon controlled rectifier 44, a diode 45, and a resistor 46. During one half-cycle of the A.C. supply, when the dot end of the secondary winding 36 is negative, a positive potential is impressed on the control electrode 47 of the silicon controlled rectifier (SCR) 44, conditioning the SCR for current conduction between its cathode 48 and anode 49. Accordingly, current is caused to flow through the SCR 44 and the secondary winding 36, this current being divided equally between the two similar paths through the diodes 26 and 27 together with their respective series-connected current-dividing resistors 51 and 52.

The very low potential across the diode 26 and the equal potential across the diode 27 during this half-cycle are represented in FIG. 2B for time $t_1$, and the substantial current through the diode 26 and equal current through the diode 27 in the same half-cycle time $t_1$ are represented in FIG. 2A for time $t_1$. In coincidence with the supplying of a current from the forward-current supply 21 which is divided between the resistors 51 and 52 and the diodes 26 and 27 respectively connected thereto, the forward-current supply 22 provides equal currents through the resistors 53 and 54 and the diodes 28 and 29 respectively connected thereto. The correspondence of the phasing between the secondary winding 41 and the secondary winding 36 is indicated by the similar dot positions adjacent these windings.

Figure 2:
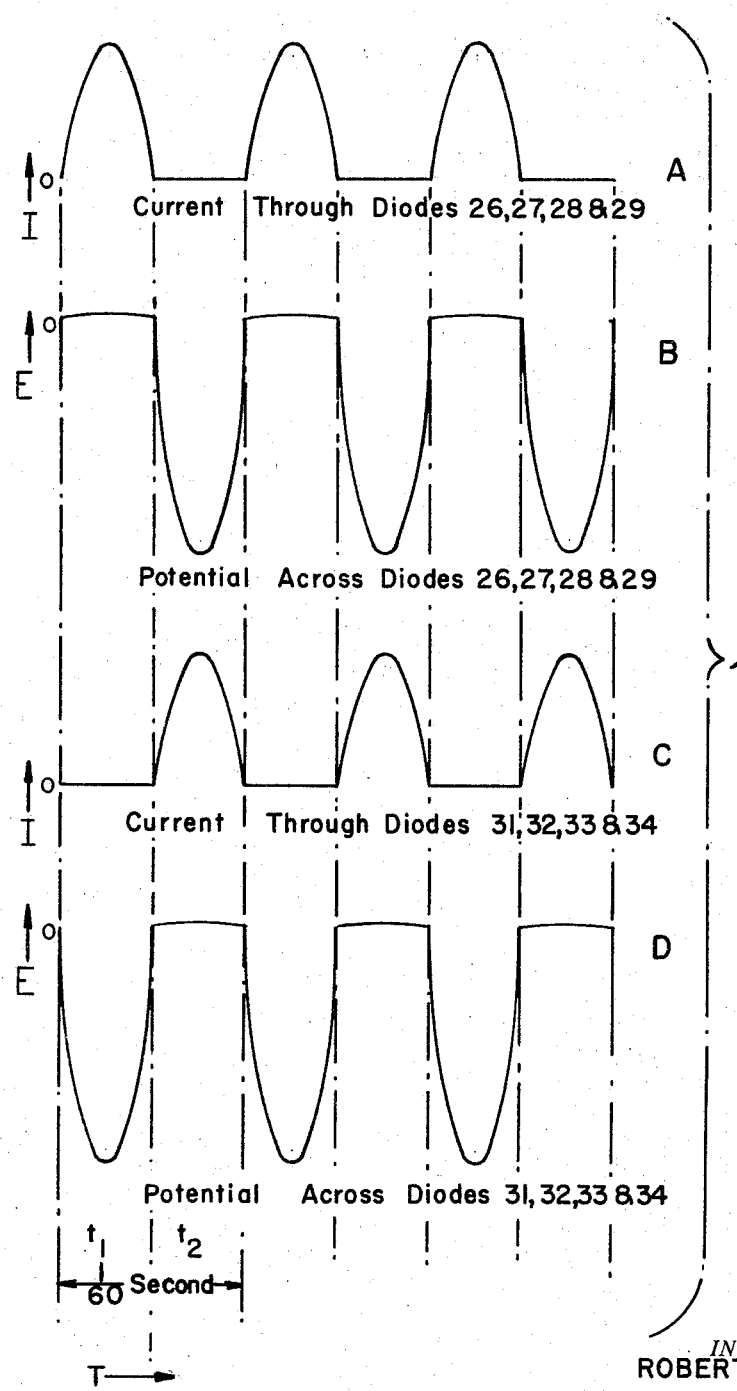
FIGS. 2A–2D are sets of graphs, drawn to a common time scale, of the potentials and currents during test of the bridge rectifiers with the embodiment of FIG. 1.

On the next half-cycle of time, i.e., period $t_2$ (FIG. 2), the forward current supply 21 and the similarly phased supply 22 are effectively switched to open-circuit condition through the operation of their respective SCR's. Upon the dot terminal of the secondary winding 36 becoming positive relative to the other terminal thereof, a substantial current flows through the resistor 46 and the diode 45, and the control electrode 47 of the SCR 44 is maintained at a potential very slightly negative relative to the cathode of this SCR. The SCR 44 is accordingly rendered incapable of conducting current between its cathode and anode, substantially in the same way as if this element were an electrically operated relay switched to its open-circuit condition. During this second half-cycle, represented as $t_2$ in FIG. 2, the forward current supply circuits 23 and 24 are active, their respective SCR's 55 and 50 being caused to conduct current, so that forward currents are simultaneously provided through diodes 31, 32, 33 and 34, as indicated in FIG. 2C.

During time $t_2$, when the SCR 44 in the forward current supply 21 and its counterpart 56 in forward current supply 22 are in open-circuit condition, a half-cycle wave of potential is impressed across diodes 26 and 27 by the circuit including the transformer 13 and the bridge rectifier 14, the polarity being such that the cathodes of the diodes 26 and 27 are positive relative to their anodes. In like manner, in the same time intervals, the inverse voltage supply 13, 14 impresses equal high inverse potentials across the diodes 28 and 29. These high-potential half waves are represented in FIG. 2B for the period $t_2$. Conversely, when the circuits 21 and 22 are active, with their SCR's in conducting condition, high inverse potentials are applied across the diodes 31, 32, 33, and 34 by the action of the transformer 13 and the bridge rectifier 14, while the diodes 26, 27, 28 and 29 are being caused to conduct substantial currents.

It will be appreciated that each diode of the bridge rectifiers under operational test is subjected to potentials substantially duplicating the output potential of the bridge rectifier 14, since one of the two diodes in series between the conductors 16 and 17 in any branch of either of the bridge rectifiers 11 and 12 has very low voltage thereacross during its conduction interval. The substantially horizontal portions of the potential waves in FIGS. 2B and 2D are curved slightly, this being an exaggeration of the very low forward potentials across the diodes when conducting.

While only two bridge rectifiers 11 and 12 are shown as being connected at one time to the operational test apparatus, these are sufficient to illustrate the way in which the apparatus is capable of simultaneously affording operational test for a great number of bridge rectifier units. It is only necessary that each additional bridge rectifier be provided with its further current-dividing resistors, similar to the resistors 51 and 53 connected to the rectifier 11 and the resistors 52 and 54 connected to the rectifier 12, and that the forward current supply circuits be such as to supply sufficient current for the number of bridge rectifiers to be tested.

The function of the SCR 44, and the diode 45 and the resistor 46 cooperating with the control electrode 47 of the SCR 44, is to prevent the output of the high voltage inverse potential circuit 13, 14 from being shunted by a low-impedance, high-current path through the forward-current supply circuit 21. It will be seen that the output potential from the rectifier 14 tends to cause the anodes of the SCR's to be positive relative to their cathodes, and hence to cause current flow through the series path including the windings 36 and 37 and the SCR's 44 and 50 connected thereto. This is prevented by the switching action of the SCR's 44 and 50, since one of these SCR's is switched off when the other is switched on. Similarly, the alternate switching of the SCR's 55 and 56 connected in series with the windings 41 and 42 prevents the output of rectifier 14 from being shorted out by this path.

The fuses 57, 58, 59 and 60 are connected in circuit with the bridge rectifiers to protect the test apparatus in the event of a failure of a bridge rectifier under test.

ALTERNATIVE EMBODIMENT

Figure 3:
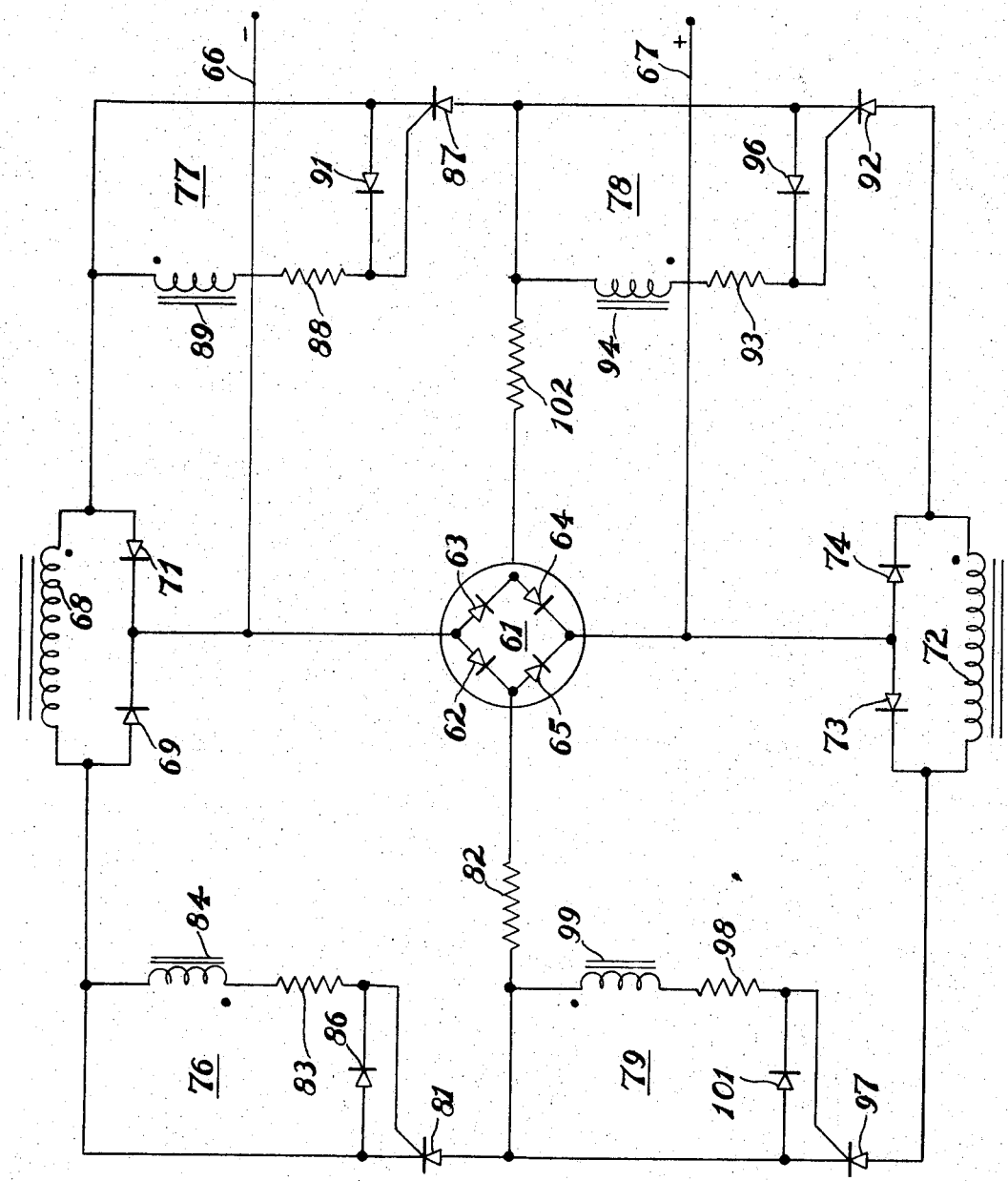
FIG. 3 is a schematic diagram of an alternative embodiment of the invention.

In FIG. 3 there is shown an alternative embodiment of the invention which, for the sake of simplicity, will be described as being employed in the testing of only one bridge rectifier; however, as should be apparent, like the embodiment of FIG. 1, it could be employed to test any number of bridge rectifiers.

Referring now to FIG. 3, the output terminals of a bridge rectifier 61 under test, which includes four silicon diodes 62–65, are connected between a pair of conductors 66 and 67. The conductors 66 and 67, in turn, are connected to a source of pulsating, unidirectional voltage (not shown) such that the conductor 67 is positive relative to the conductor 66.

The opposite ends of a transformer secondary winding 68 are connected through respective steering diodes 69 and 71 to the conductor 66, and the opposite ends of a transformer secondary winding 72 are connected through respective steering diodes 73 and 74 to the conductor 67. The windings 68 and 72 are both associated with the same primary winding (not shown) and are phased as shown by the dots.

Four identical switching circuits 76–79, connected respectively to the diodes 62–65, are provided for causing forward current to flow therethrough. The switching circuit 76 includes an SCR 81 having its anode connected to the cathode of the diode 62 through a current limiting resistor 82 and its cathode connected to one end of the winding 68. The control electrode of the SCR 81 is connected through a resistor 83 and a transformer secondary winding 84 to the cathode of the SCR 81, and is also connected through a diode 86 thereto. The switching circuits 77, 78 and 79 are similarly arranged: the circuit 77 including an SCR 87, a resistor 88, a secondary winding 89 and a diode 91; the circuit 78 including an SCR 92, a resistor 93, a secondary winding 94 and a diode 96; and the circuit 79 including an SCR 97, a resistor 98, a secondary winding 99 and a diode 101. A current limiting resistor 102 is connected from the junction of the SCR's 87 and 92 to the junction of their respective diodes. The windings 84, 89, 94 and 99 are phased as shown by the dots and are all associated with the same primary winding (not shown) which has the same phase as the primary winding associated with th secondary winding 68 and 72.

In operation, during the half-cycle when the dot ends of the secondary windings 68, 72, 84, 89, 94 and 99 are positive, the control electrodes of the SCR's 81 and 92 are positive relative to their cathodes, thereby causing the SCR's 81 and 92 to be switched to their high conduction states. This results in forward current being passed through the rectifier diodes 62 and 64. The path for forward current through the diode 62 is traced from the dot end of the winding 68 through the diode 71, the diode 62, the resistor 82 and the SCR 81 to the opposite end of the winding 68. The path for forward current through the diode 64 is traced from the dot end of the winding 72 through the SCR 92, the resistor 102, the diode 64 and the diode 73 to the opposite end of the winding 72. The control electrodes of the SCR's 87 and 97 are negative relative to their cathodes during this half-cycle and, accordingly, these SCR's remain in their open-circuit states, whereby inverse voltages are applied to the diodes 63 and 65.

In a like manner, during the half-cycle when the dot ends of the secondary windings 68, 72, 84, 89, 94 and 99 are negative, the SCR's 87 and 97 are switched to their high conduction states and the SCR's 81 and 92 are switched to their open-circuit states. Accordingly, forward currents are passed through the diodes 63 and 65 and inverse voltages are applied to the diodes 62 and 64.

An important feature of the present invention is its very low power consumption prevailing even though the bridge rectifiers such as rectifiers 11 and 12 are subjected to operation at their full-rated currents and at their full-rated inverse voltages. Even though the transformer-rectifier supply 13, 14 supplies quite high inverse potential to all of the bridge rectifiers under operational test, the latter draw substantially no current, and hence the transformer 13 and rectifier 14 need not have substantial power capacity.

The forward-current supply circuits are required to provide large currents, the total current requirement imposed on each such circuit being directly proportional to the number of bridge rectifiers to be simultaneously subjected to the operational test. However, these forward current supply circuits are arranged to operate at very low voltage. Hence, here again, the power requirements are very low.

It will be seen that the present invention provides time-variations of voltage and current which substantially duplicate the operation of each bridge rectifier in its use in a power supply. Just as in its normal power supply circuit application, each bridge rectifier has two opposite diodes conducting substantial currents while the two diodes connected between those diodes are being subjected to high inverse voltage. Hence, any physical effects on the diodes in a given mechanical configuration, whether or not potted in a single unit or otherwise physically arranged as a unitary device, are identical in the present operational test system to those prevailing in the use of the bridge rectifier in a power supply.

What is claimed is:

1. In an apparatus for alternately subjecting diodes in opposed arms of each of a plurality of bridge rectifiers to forward conduction current and inverse peak voltages each bridge rectifier comprising four diodes connected in a ring with two alternating current input terminals and two output terminals, the four diodes being connected to conduct current in a predetermined direction from a first one of said output terminals to the opposite output terminal by way of two paths, two of said four diodes being conducted in series in one of said paths and the other two diodes being connected in series in the other of said paths, the input terminals of the bridge rectifier being the junctions between the two series-connected diodes in each path:

a unidirectional voltage impressing means connected between said first output terminal and said opposite output terminal and polarized opposite to said predetermined direction of current conduction for imposing substantial inverse voltage on said diodes; and individual cyclical means associated with each of said diodes for passing current during alternate half-cycles in the forward current direction through one of the two diodes in one of said paths and through one of the two diodes in the other path and passing current during the other half-cycles in the forward current direction through the other two diodes, so that the inverse voltage from said voltage impressing means is applied during each half-cycle across each of the two diodes through which current is not then being passed in the forward direction by said cylical means.

2. Apparatus as defined in claim 1, wherein said cyclical means comprises low-voltage, high-current supplying and switching means for passing current through two of the diodes of the bridge rectifier and for rendering said other diodes nonconductive to subject said other two diodes to said inverse voltage from said unidirectional voltage impressing means.

3. Apparatus as defined in claim 2, wherein said low-voltage, high-current supplying and switching means comprises four synchronously switched current supply circuits arranged for supplying current through the respective ones of the four diodes of each bridge rectifier under test, each synchronously switched current supply circuit including a low-voltage, high-current transformer secondary winding, and semiconductor switch means connected thereto and conductively coupled to a diode of each bridge rectifier under test, said switch means closing the circuit of the secondary winding when the output potential of the winding is of the same polarity as the current conduction polarity of the associated bridge rectifier diode to pass forward current through the diode and opening the circuit of the secondary winding when the output potential thereof is of the opposite polarity to preclude forward current flow through the diode.

4. Apparatus as defined in claim 3, wherein said semiconductor switch means comprises a silicon controlled rectifier, a diode and a resistor, the cathode of the silicon controlled rectifier being connected to one terminal of said secondary winding, the diode and the resistor being connected in parallel with said secondary winding, the anode of said diode being connected to said one terminal of said secondary winding, the junction between said diode and said resistor being connected to the control electrode of said silicon controlled rectifier, the other terminal of the secondary winding and the other terminal of the resistor being conductively connected to each other and to the associated bridge rectifier diode, and the anode of the silicon controlled rectifier being conductively connected to the associated bridge rectifier diode.

5. Apparatus as defined in claim 4, wherein said unidirectional voltage source is a source of full-wave-rectified alternating current, its voltage being substantially equal to the maximum inverse voltage to be withstood in practical use by the diodes of said bridge rectifier.

6. Apparatus as defined in claim 2, wherein the low-voltage, high-current supplying and switching means includes:
   a first current supplying circuit, including a transformer winding and a pair of steering diodes, for alternately supplying forward current to each of a first pair of the diodes;
   a second current supplying circuit, including a transformer winding and a pair of steering diodes, for alternately supplying forward current to each of a second pair of the diodes;
   first and second switching circuits connected to respective ones of the first pair of diodes and to the first current supplying circuit, said switching circuits being cyclically operable to couple the current supplying circuit to a first one of the diodes to pass forward current therethrough, while simultaneously de-coupling the current supplying circuit from the second diode, and then to de-couple the current supplying circuit from the first diode, while simultaneously coupling the current supplying circuit to the second diode to pass forward current therethrough; and
   third and fourth switching circuits connected to respective ones of the second pair of diodes and to the second current supplying circuit, said switching circuits being cyclically operable to couple the current supplying circuit to a first one of the diodes to pass forward current therethrough, while simultaneously de-coupling the current supplying circuit from the second diode, and then to de-couple the current supplying circuit from the first diode, while simultaneously coupling the current supplying circuit to the second diode to pass forward current therethrough.

7. Apparatus for aging bridge rectifiers for operation at predetermined values of inverse peak voltage and forward conduction current, each bridge rectifier comprising four semiconductor diodes connected in a ring with four terminals, the four diodes being connected to current in a predetermined direction from a first one of said terminals to the opposite terminal by way of two paths, two of said four diodes being connected in series in one of said paths and the other two diodes being connected in series in the other of said paths, the alternating current input terminals of the bridge rectifier being the junctions between the two series-connected diodes in each path, which apparatus comprises:
   a low-current, high-voltage unidirectional potential source connected between said first terminal and said opposite terminal and polarized opposite to said predetermined direction of current conduction for supplying high inverse voltage to said diodes; and
   cyclical means for passing current during alternate half-cycles in the forward current direction through one of the two diodes in one of said paths and through the opposite diode in the other of said paths and passing current during the intervening half-cycles in the forward current direction through the other two diodes,
      said cyclical means comprising low-voltage, high-current supply means and a switch coupled to each diode, each switch being operable to close the circuit to its diode when the potential of the associated supply means is polarized in the same direction as that for current conduction through the diode to thereby pass current from the supply means through the diode, and to open the circuit to its diode when the potential of the associated supply means is polarized in the opposite direction to preclude current flow through the diode.

8. In an electrical aging apparatus for a four-arm bridge rectifier having a diode in each of said arms with two of said diodes connected in series in one path from one output terminal to another output terminal, and with the other two diodes connected in series in a second path from said one output terminal to the other output terminal with the junctions between said series connected diodes in each path being input terminals:
   alternately operated individual means associated with each of said diodes for passing current through one of the two diodes in each of said paths and then through the other diodes in each of said paths; and
   a unidirectional voltage impressing means connected to the output terminals and polarized opposite to a predetermined direction of current conduction from said first output terminal to said second output terminal for impressing inverse peak voltage on the diodes through which current is not passed.

9. In a system for subjecting a four-arm diode bridge rectifier to predetermined operating currents and reverse voltages:
   four control circuits each including an electronic switching device connected across each diode in said bridge rectifier;
   means for alternately operating the electronic switching devices connected to each pair of oppositely disposed diodes;
   means responsive to the operation of the electronic switching devices for applying potential and current to the associated pairs of diodes to render these diodes conductive; and
   means rendered effective by the cutting off of each pair of electronic switching devices for applying a predetermined reverse voltage to the associated pair of diodes.

10. In a system for subjecting a four-arm diode bridge rectifier to predetermined operating currents and reverse voltages as set forth in claim 9, wherein:
   said electronic switching device is a silicon-controlled rectifier having an anode, a cathode and a gating electrode characterized in that a trigger potential applied to the gating electrode switches the device into a conducting state.

11. In a system for subjecting alternately diodes in opposed arms of a four-arm bridge rectifier to predetermined operating currents and reverse voltages;
   a switching subcircuit associated with each of said arms of the bridge, each of said subcircuits comprising:
      a coil having first and second ends;
      means for alternately driving negative and positive said first and second ends of said coil associated with one of said diodes; and
      a silicon-controlled rectifier having an anode, a cathode connected to said first end of said coil and a gating electrode connected in series to the second end of the coil characterized in that said drive means alternately operates and then cuts off the silicon-controlled rectifier associated with said one diode to recurrently supply currents to said diodes; and
   means rendered effective on alternate half-cycles of said driving means for impressing inverse peak voltages across the diodes in one pair of said opposed arms and for rendering effective the drive means in the subcircuits for the other pair of opposed arms to subject the diodes in the other pair of opposed arms to said predetermined currents.

(References on following page)

References Cited

UNITED STATES PATENTS

| | | | |
|---|---|---|---|
| 2,762,975 | 9/1956 | Bregar | 324—131 XR |
| 3,134,944 | 5/1964 | Newman | 324—158 |
| 3,311,826 | 3/1967 | Galman | 324—131 XR |

OTHER REFERENCES

R.C.A. Technical Notes, Number 357, June 1960, 1 page.

RUDOLPH V. ROLINEC, Primary Examiner.

E. L. STOLARUN, Assistant Examiner.